United States Patent
Dunn et al.

(10) Patent No.: US 11,039,397 B2
(45) Date of Patent: **\*Jun. 15, 2021**

(54) SYSTEM AND METHOD FOR CLOSED LOOP UPLINK POWER CONTROL

(71) Applicant: Corning Optical Communications LLC, Charlotte, NC (US)

(72) Inventors: Brian Dunn, Menlo Park, CA (US); Hithesh Nama, Los Altos, CA (US); Srinivas Pinagapany, Bangalore (IN); Jaspreet Singh, Upland, CA (US)

(73) Assignee: Corning Optical Communications LLC, Charlotte, NC (US)

( \* ) Notice: Subject to any disclaimer, the term of this patent is extended or adjusted under 35 U.S.C. 154(b) by 0 days.

This patent is subject to a terminal disclaimer.

(21) Appl. No.: 16/880,052

(22) Filed: May 21, 2020

(65) Prior Publication Data
US 2020/0288405 A1    Sep. 10, 2020

Related U.S. Application Data

(63) Continuation of application No. 15/975,922, filed on May 10, 2018, now Pat. No. 10,694,468, which is a
(Continued)

(51) Int. Cl.
*H04W 52/08* (2009.01)
*H04W 52/14* (2009.01)
(Continued)

(52) U.S. Cl.
CPC ......... *H04W 52/08* (2013.01); *H04W 52/146* (2013.01); *H04W 52/221* (2013.01); *H04W 52/241* (2013.01); *H04W 52/367* (2013.01)

(58) Field of Classification Search
CPC ............... H04W 52/08; H04W 52/221; H04W 52/241; H04W 52/367; H04W 52/146
See application file for complete search history.

(56) References Cited

U.S. PATENT DOCUMENTS 8,483,742 B2   7/2013  Kim et al.
9,974,027 B2   5/2018  Nama et al.
(Continued)

OTHER PUBLICATIONS

Foschini, Gerard, "A Simple Distributed Autonomous Power Control Algorithm and its Convergence," IEEE Transactions on Vehicular Technology, vol. 42, Issue 4, Nov. 1993, pp. 641-646.
(Continued)

*Primary Examiner* — Will W Lin
(74) *Attorney, Agent, or Firm* — C. Keith Montgomery

(57) ABSTRACT

Systems and methods are disclosed that provide a closed loop power control system including adaptively adjusting the desired target SINR over time so as to ultimately achieve a feasible SINR. In one implementation, a method is provided of optimizing uplink closed loop power control in a RAN in which one or more base stations each service a plurality of mobile stations, including: determining a power level for each mobile station for its respective uplink transmissions, including measuring a current achieved SINR for each mobile station; and for each mobile station, adjusting the power level to be sufficiently high to meet desired transmission characteristics but not so high as to cause unnecessary interference with transmissions from other mobile stations, by adjusting a desired target SINR based on factors selected from the following: current and prior achieved SINRs, current and prior interference measurements, and current and prior transmission power control commands.

19 Claims, 6 Drawing Sheets

Related U.S. Application Data continuation of application No. 15/050,704, filed on Feb. 23, 2016, now Pat. No. 9,974,027.

(51) Int. Cl.
*H04W 52/22* (2009.01)
*H04W 52/24* (2009.01)
*H04W 52/36* (2009.01)

(56) References Cited

U.S. PATENT DOCUMENTS

| | | | |
|---|---|---|---|
| 2008/0261645 A1 | 10/2008 | Luo et al. | |
| 2010/0254292 A1 | 10/2010 | Kim et al. | |
| 2011/0044296 A1* | 2/2011 | Zhang | H04W 52/42 370/336 |
| 2011/0116400 A1 | 5/2011 | Park et al. | |
| 2011/0117953 A1 | 5/2011 | Kim et al. | |
| 2011/0199945 A1 | 8/2011 | Chang et al. | |
| 2012/0307745 A1 | 12/2012 | Panchal et al. | |
| 2013/0115998 A1 | 5/2013 | Lamm et al. | |
| 2013/0190035 A1* | 7/2013 | Wang | H04W 52/241 455/522 |
| 2013/0294334 A1 | 11/2013 | Kabashima | |
| 2013/0322359 A1 | 12/2013 | Hunsaker et al. | |
| 2014/0011535 A1 | 1/2014 | Jeon | |
| 2014/0099968 A1 | 4/2014 | Burchardt et al. | |
| 2014/0204861 A1 | 7/2014 | Tie et al. | |
| 2014/0211737 A1 | 7/2014 | Takeda et al. | |
| 2014/0211797 A1 | 7/2014 | Luo et al. | |
| 2015/0139111 A1 | 5/2015 | Fodor et al. | |
| 2016/0183198 A1* | 6/2016 | Xu | H04W 52/241 455/522 |
| 2017/0245218 A1* | 8/2017 | Nama | H04W 52/241 |
| 2018/0262992 A1 | 9/2018 | Dunn et al. | |

OTHER PUBLICATIONS

Non-Final Office Action for U.S. Appl. No. 15/975,922, dated Aug. 6, 2019, 18 pages.
Notice of Allowance for U.S. Appl. No. 15/975,922, dated Feb. 5, 2020, 9 pages.
Non-Final Office Action for U.S. Appl. No. 15/050,704, dated Aug. 24, 2017, 22 pages.
Notice of Allowance for U.S. Appl. No. 15/050,704, dated Jan. 23, 2018, 10 pages.

* cited by examiner

If (TPC(t-1) > 0 dB)

If (a_SINR(t) < a_SINR (t-1)+Delta1)

If (Intf(t) > Intf(t-1)+Delta2)

dT_SINR(t)=dT_SINR(t-1)−(dT_SINR(t-1)− a_SINR(t))/2 end end end

FIG. 5

If (TPC(t-1) > 0 dB)

If (a_SINR(t) < a_SINR (t-1)+Delta1)

If ( (Intf(t) > Intf(t-1)+Delta2) and (Intf(t) < Intf(t-1)+Delta3) )

dT_SINR(t)=dT_SINR(t-1)−(dT_SINR(t-1)− a_SINR(t))/2 end end end

FIG. 6

If ( (|dT_SINR(t) − a_SINR(t)| < min(|NonZeroTPC|) or (UE Tx power > P0) )

TPC(t) = -min(|NegTPC|)

End

FIG. 7

SYSTEM AND METHOD FOR CLOSED LOOP UPLINK POWER CONTROL

CROSS-REFERENCE TO RELATED APPLICATIONS

This application is a continuation of U.S. patent application Ser. No. 15/975,922, filed May 10, 2018, which is a continuation of U.S. patent application Ser. No. 15/050,704, filed Feb. 23, 2016, now U.S. Pat. No. 9,974,027, the content of which is relied upon and incorporated herein by reference in its entirety, and the benefit of priority under 35 U.S.C. § 120 is hereby claimed.

FIELD

The invention relates to the field of transmission power for cellular consumer equipment

BACKGROUND

Operators of mobile systems, such as Universal Mobile Telecommunications Systems (UMTS) and its offspring including Long Term Evolution (LTE) and LTE-Advanced, continue to rely on advanced features for improving the performance of their radio access networks (RANs). For improving the performance of uplink transmissions (i.e., transmissions from the mobile station or user equipment (UE), to the base station or evolved Node B (eNB)), one such feature is uplink power control. Uplink power control facilitates adjusting the transmit power of the UE, to ensure that the power level is set sufficiently high to meet the desired transmission characteristics (i.e., the desired modulation, coding rate, etc.), but is not excessively high to cause unnecessary interference to transmissions from other UEs in the network.

RANs may employ uplink power control in an open loop manner, i.e., without any explicit feedback from the eNB to the UE with regards to the power level at which the UE should transmit on the uplink. While such systems have the benefit of simplicity, open loop power control (OLPC) is generally a sub optimal approach. In particular, it often results in overprovisioning of the UE transmit power, causing excessive system-level interference and lowering the UE battery life. With only OLPC in place, such overprovisioning is, however, often necessary, as high transmit power is required to guarantee achievability of the highest SNR needed for maximizing link throughput, for countering any uplink-downlink path loss imbalance, and for overcoming uplink interference.

Closed loop power control (CLPC) has also been attempted, and provides for power control feedback from, e.g., an eNB to the UE. A feedback command (also referred to as a transmit power control (TPC) command) instructs the UE to apply an appropriate adjustment to its transmit power level. In practical systems, such as 3GPP LTE, the TPC command belongs to one out of a discrete set of possible values.

In particular, one procedure that may be employed for implementing CLPC in practice is depicted in the flowchart of FIG. 1, and is based on the algorithm proposed in "A Simple Distributed Autonomous Power Control Algorithm And Its Convergence", by Foschini and Miljanic, IEEE Transactions On Vehicular Technology, Vol. 42, No. 4 (November 1993). The procedure is followed independently for each eNB-UE link in the network, so this approach may also be referred to as a "distributed" power control. The procedure entails defining a desired target value for the signal to interference plus noise ratio (SINR) for the eNB-UE link, and such is referred to as dT_SINR, i.e., a desired target SINR. The desired target SINR may be, for example, a SINR required to meet a certain BLER (block error rate) criterion, for a desired choice of the transmission modulation and coding (MCS) parameters. Based on the current received signal from the UE, e.g., such as uplink data symbols, uplink reference symbols, etc., the eNB measures a current achieved SINR, termed a_SINR(t) (step 12), with t denoting the current time instant. Depending on the difference in the target SINR and the current achieved SINR value, i.e., depending on (dT_SINR−a_SINR(t)), the eNB feeds back a TPC command (denoted TPC(t)) to the UE (step 14).

In a practical set-up, where the set of possible TPC values is fixed a priori (as in 3GPP LTE), the eNB may map the difference (dT_SINR−a_SINR) to the nearest entry in the set of TPC values, and feed it back to the UE. The UE then applies the received TPC command to modify the transmit power on subsequent transmissions until instructed otherwise (step 16).

The power control approach of FIG. 1 may be applied independently (and in parallel) for each eNB-UE link. At any point of time, the network may contain a set of these links, with each link attempting to achieve its own desired target SINR.

Generally, using the approach of FIG. 1, each link achieves its target SINR, provided that the set of target SINRs is jointly feasible to begin with. In other words, if the channels between the different eNBs and the different UEs are such that it is possible to achieve the desired target SINRs for all the links using a certain set of UE transmit power levels, the approach in FIG. 1 would likely lead the UEs to transmit at these required power levels.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Drawbacks of the Existing Approach: If the set of desired target SINRs is not feasible to begin with, the approach can be considerably more problematic. In particular, the approach may lead the UEs to ramp-up their transmit powers, even though the achieved SINR values would not be approaching the desired target SINR values. In the worst case scenario when the UEs are positioned close to corresponding cell edges, it may cause the UEs to continuously increase their transmit powers without any SINR improvements at all. Not only would such an occurrence lower the UE battery life, but it would also unnecessarily cause high interference levels in the network. Consequently, it is important to develop new techniques that prevent/curtail such uncontrolled and unnecessary power ramp-up, while still providing the SINR gains, when achievable.

Systems and methods according to present principles meet the needs of the above in several ways. In particular, systems and methods according to present principles employ a closed loop power control (CLPC) system but with the addition of adaptively adjusting the desired target SINR over time, taking into account the prevailing signal power and interference power measurements, in order to ultimately approach a target SINR that is actually feasible. Methods that facilitate such operation, and several other improvements are also described.

In one aspect, the invention is directed towards a non-transitory computer readable medium, containing instructions for causing a computing environment to perform a method of optimizing uplink closed loop power control in a RAN in which one or more base stations each service a plurality of mobile stations, the method including the steps of: a. determining a power level for each mobile station for its respective uplink transmissions, including measuring a current achieved SINR for each mobile station; and b. for each mobile station, adjusting the power level to be sufficiently high to meet desired transmission characteristics but not so high as to cause unnecessary interference with transmissions from other mobile stations, by adjusting a desired target SINR based on one or more factors selected from the following: current and prior achieved SINRs, current and prior interference measurements, and current and prior transmission power control commands.

Implementations of the invention may include one or more of the following. The adjusting may include sending a transmission power control (TPC) command based on the difference between the desired target SINR and the current achieved SINR (dT_SINR−a_SINR). The adjusting may include mapping the difference to a nearest entry in a set of possible TPC values. If the difference is positive, then the method may include sending a transmission power control command to the mobile station to increase its transmit power. If the difference is negative, then the method may include sending a transmission power control command to the mobile station to decrease its transmit power. The method may further include determining if the desired target SINR is feasible. The method may further include determining if one or more mobile stations are progressing towards their desired target SINR. The method may further include: a. if a TPC command sent at a prior time instructs a mobile station to increase its transmit power, and if an achieved SINR at the current time does not exceed the achieved SINR at the prior time by a first threshold; and b. if the interference measured at the current time exceeds the interference measured at the prior time by a second threshold, c. then determining a desired target SINR at the current time, the determining including reducing the desired target SINR at the prior time, e.g., by an amount equal to half of a difference between the desired target SINR at the prior time and the achieved SINR at the current time, or by another amount that is some function of the difference between the desired target SINR at the prior time and the achieved SINR at the current time. The first threshold may be a time-dependent parameter and may be a function of the transmission power control at the prior time, the achieved SINR at the prior time, and the interference level at the prior time. The first threshold may alternatively be a constant parameter and/or may be a function of a positive TPC command. The second threshold may be a constant, and/or may be a function of a positive TPC command.

The method may further include determining if a rise in a measured interference level over a prior duration exceeds a threshold, and if so, maintaining the desired target SINR, whereby situations may be identified when interference rises but it is undesired to reduce the target SINR. The method may further include providing a lower bound on the desired target SINR value, where the lower bound is a SINR value required to support reliable communication with a lowest possible modulation and coding rate combination. The method may further include determining if a current achieved SINR is close to the desired target SINR, or if the mobile station transmit power level exceeds a certain threshold, and if one or both conditions are met, then sending a TPC command to the mobile station to instruct the mobile station to reduce its transmit power, whereby a mobile station transmit power may be reduced when feasible without impacting performance of a link. The current achieved SINR may be determined to be close to the desired target SINR if the magnitude of their difference is lower than the smallest possible magnitude of a nonzero value TPC command. The method may further include resetting the target SINR to a higher value, and transmitting a TPC to a mobile station to cause its power level to increase, if determined interference levels are determined to have been reduced beyond a threshold level. The method may further include: a. periodically or occasionally, resetting the target SINR to a value exceeding a current achieved SINR by a differential amount; b. whereby problems associated with increasing a target SINR based on a decrease in measured interference are substantially or wholly avoided. The differential amount may be one 1 dB. The method may further include providing an upper bound on the desired target SINR value, where the upper bound is the SINR required to support a largest modulation and coding rate combination, or where the upper bound is adaptive over time and based on the largest anticipated MCS that would be used, given the payload information.

In another implementation, the invention is directed towards a method of optimizing uplink closed loop power control in a RAN in which one or more base stations each service a plurality of mobile stations, the method including the steps of: a. determining a power level for each mobile station for its respective uplink transmissions, including measuring a current achieved SINR for each mobile station; and b. for each mobile station, adjusting the power level to be sufficiently high to meet desired transmission characteristics but not so high as to cause unnecessary interference to transmissions from other mobile stations, by adjusting a desired target SINR based on one or more factors selected from the following: current and prior achieved SINRs, current and prior interference measurements, and current and prior transmission power control commands.

Advantages of the invention may include, in certain embodiments, one or more of several link level and system level advantages, as discussed below. In addition, enabling CLPC in the ways described overcomes the bottleneck noted above. Specifically, the disclosed CLPC methods facilitate achieving high throughputs with optimized (rather than excessively high) levels of UE transmit powers, bringing down the interference levels, resulting in system level capacity improvements, and enhancing UE battery life. Further, they provide the ability to ride over steady uplink interference, e.g., interference seen in a small cell deployment (i.e., a deployment with smaller cell sizes compared to the sizes of traditional macro cells) from the UEs connected to macro cells, and also offer robustness by helping counter the imbalance in uplink and downlink path losses, all the while resulting in optimized (rather than excessive) uplink transmit power levels, thereby leading to increased system capacity. Other advantages will be understood from the description that follows, including the figures and claims.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

FIG. 5 shows an exemplary code snippet related to the determination of the instances when it is desired to adjust the target SINR, and the appropriate adjustment to be applied to the target SINR, according to present principles.

FIG. 6 shows another exemplary code snippet related to the determination of instances when it is desired to adjust the target SINR, and the appropriate adjustment to be applied to the target SINR, according to present principles.

FIG. 7 shows an exemplary code snippet related to the determination of instances when it may be desired to reduce the UE transmit power, and the appropriate reduction to be applied, according to present principles.

Like reference numerals refer to like elements throughout. Elements are not to scale unless otherwise noted.

DETAILED DESCRIPTION

Figure 1:
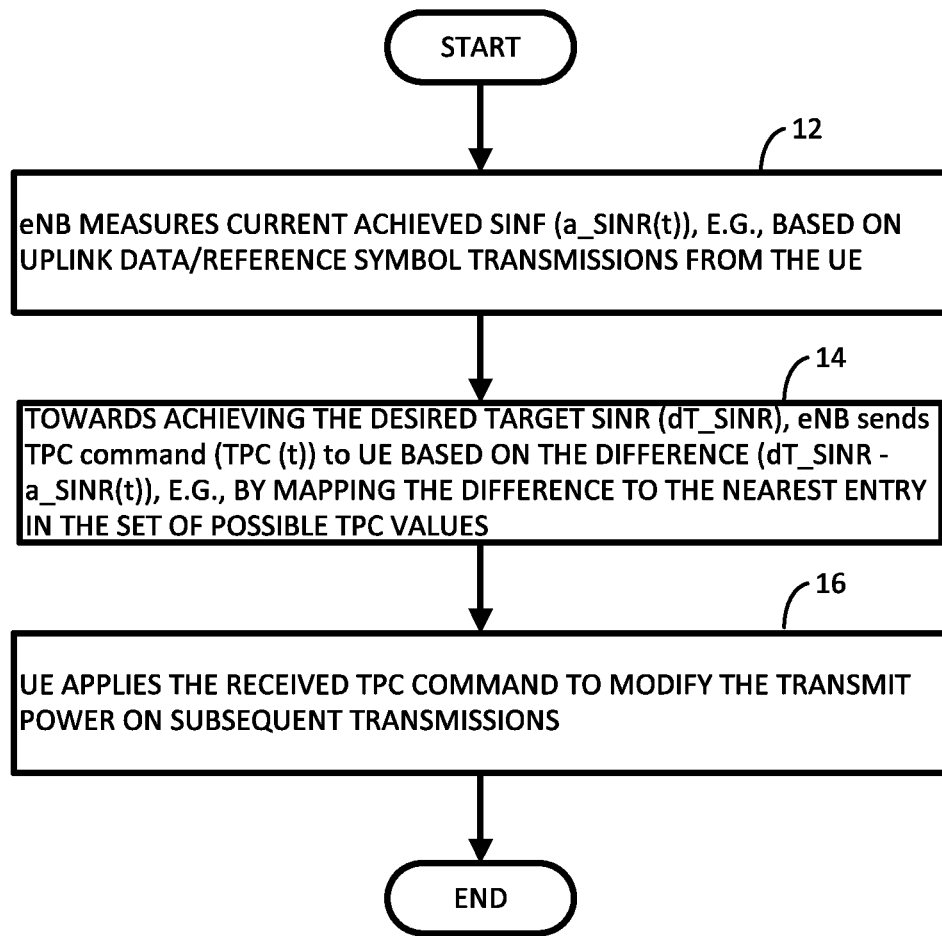
FIG. 1 shows a flowchart for a method of implementing CLPC based on prior art.
Figure 2:
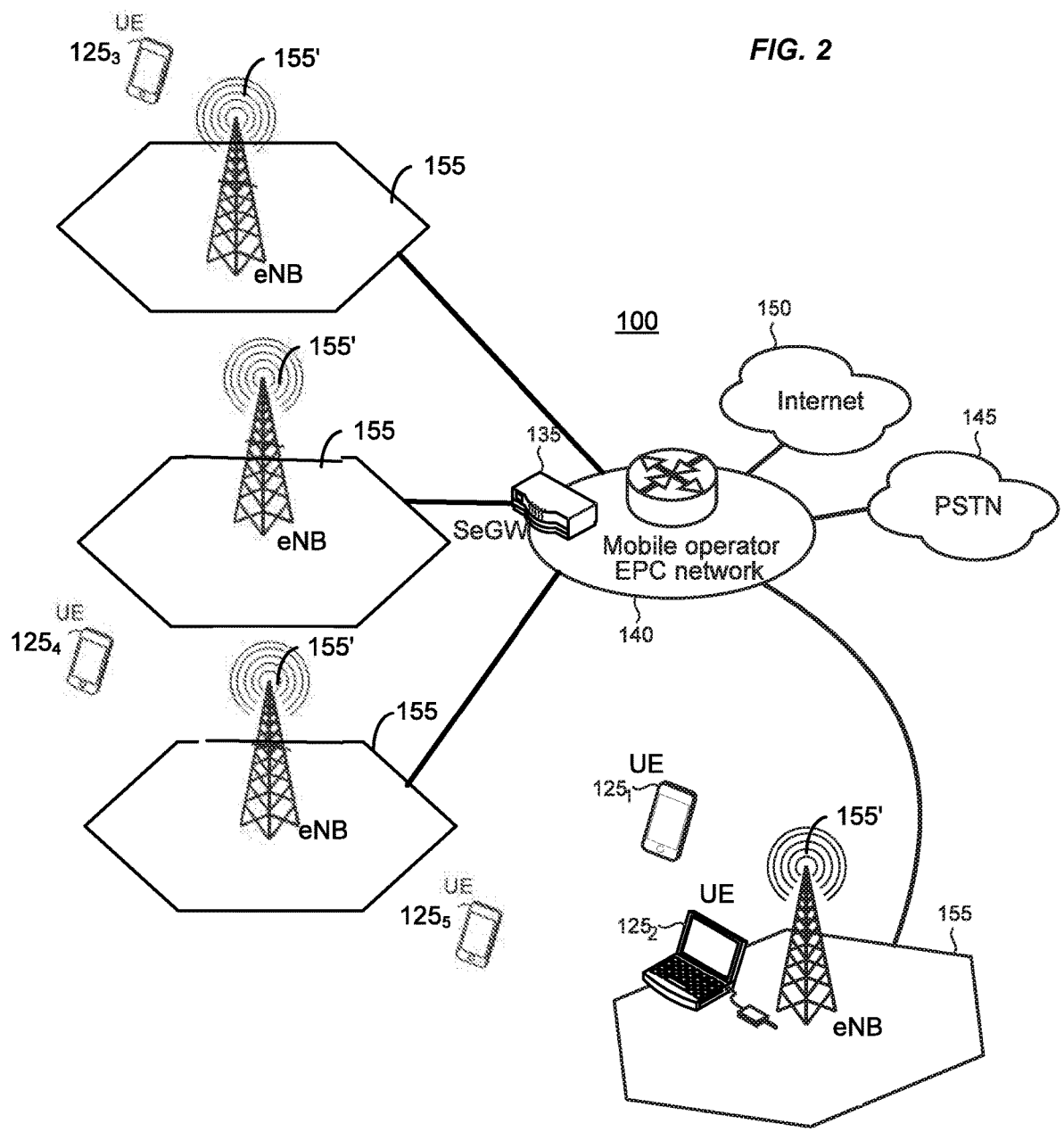
FIG. 2 shows an illustrative mobile telecommunications environment in which systems and methods according to present principles may be practiced, in particular a general arrangement including eNodeBs and user equipments.
Figure 3:
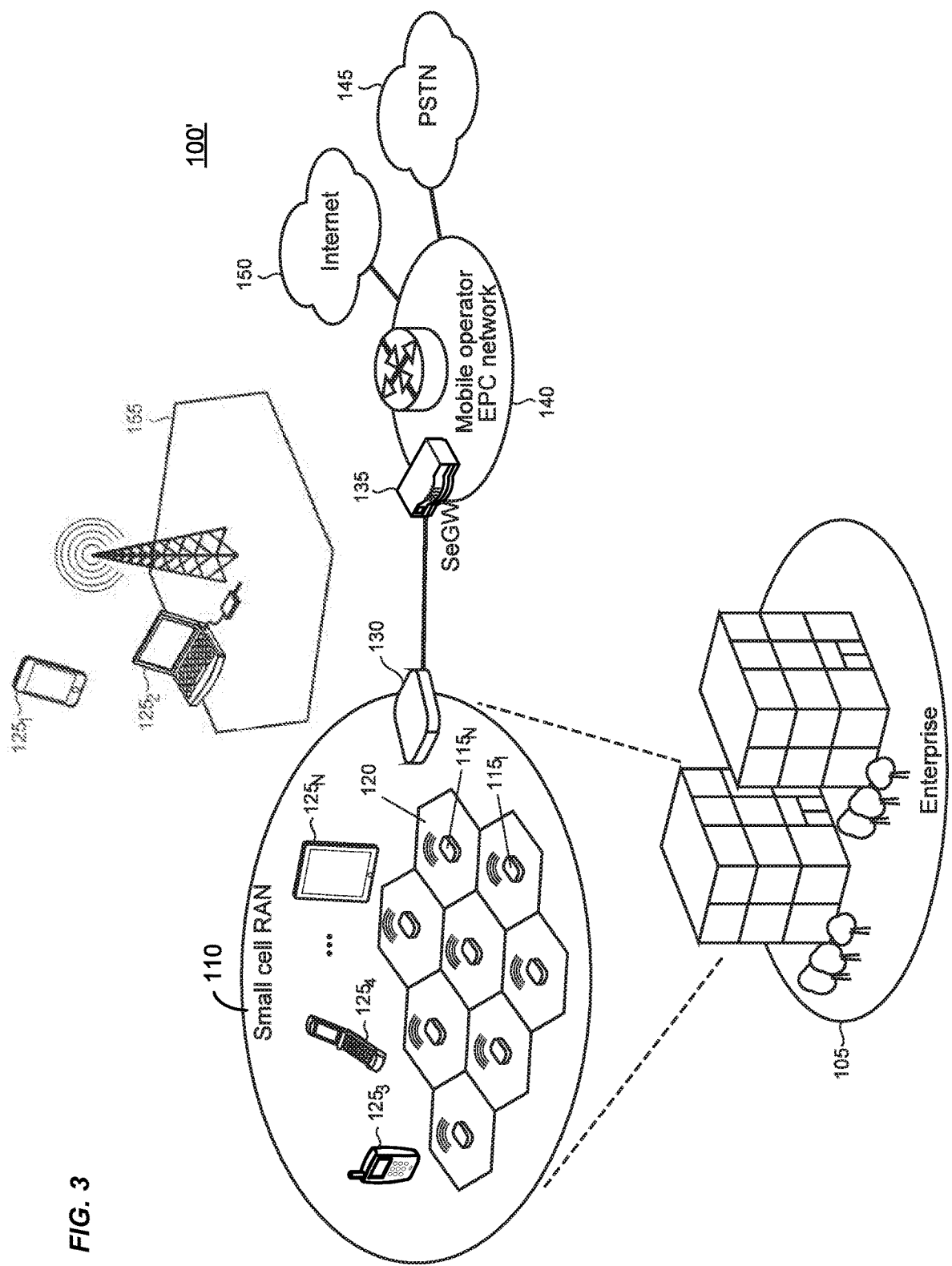
FIG. 3 shows another illustrative mobile telecommunications environment in which systems and methods according to present principles may be practiced, in particular related to small cell RANs.

FIG. 2 shows an illustrative mobile telecommunications environment 100 in which the present invention may be practiced. The mobile telecommunications environment 100, in this illustrative example, is arranged as an LTE system as described by the Third Generation Partnership Project (3GPP) as an evolution of the GSM/UMTS standards (Global System for Mobile communication/UMTS). It is emphasized, however, that the present principles described herein may also be applicable to other network types and protocols. For example, other network types and protocols that may be employed include, without limitation HSPA, LTE, CDMA2000, GSM, IEEE 802.11/Wi-Fi, 802.16 etc. or a mixture of technologies such as with a multi-standard radio (MSR) node (e.g., LTE/HSPA, GSM/HS/LTE, CDMA2000/LTE, etc). For example, referring to FIG. 3, an implementation within small cell RANs is described.

Referring to FIG. 2, the environment 100 may include a number of cells 155, each generally including an Evolved Node B (eNB) base station 155', as shown. A given user equipment (UE) 125 (shown as UE $125_1$-$125_5$) generally achieves connectivity to a mobile operator EPC network 140 through the cell 155 in the environment 100. The mobile operator EPC network 140 is typically configured to communicate with a public switched telephone network (PSTN) 145 to carry circuit-switched traffic, as well as for communicating with an external packet-switched network such as the Internet 150.

As noted, in some implementations, the mobile telecommunications environment 100' may include a small cell RAN. In this case, and referring to FIG. 3, the environment 100' includes an enterprise 105 in which a small cell RAN 110 is implemented. The small cell RAN 110 includes a plurality of RNs (radio nodes, or, base stations) $115_1$ . . . $115_N$. Each RN 115 has a radio coverage area (graphically depicted in the drawings as a hexagonal shape) that is commonly termed a small cell. A small cell may also be referred to as a femtocell. Using terminology defined by 3GPP, the small cell Radio node may also be referred to as a Home Evolved Node B (HeNB). In the description that follows, the term "cell" typically means the combination of a base station and its radio coverage area unless otherwise indicated. A representative cell is indicated by reference numeral 120 in FIG. 3.

The size of the enterprise 105 and the number of cells deployed in the small cell RAN 110 may vary. In typical implementations, the enterprise 105 can be from 50,000 to 500,000 square feet and encompass multiple floors and the small cell RAN 110 may support hundreds to thousands of users using mobile communication platforms such as mobile phones, smartphones, tablet computing devices, and the like (referred to as UEs and indicated by reference numerals $125_{1-N}$ in FIG. 3). However, the foregoing is intended to be illustrative and the solutions described herein can be typically expected to be readily scalable either upwards or downwards as the needs of a particular usage scenario demand.

In this particular illustrative example, the small cell RAN 110 includes one or more SNs (represented as a single SN 130 in FIG. 3) that manage and control the RNs 115. In alternative implementations, the management and control functionality may be incorporated into a RN, distributed among nodes, or implemented remotely, i.e., using infrastructure external to the small cell RAN 110. The RNs 115 are coupled to the SN 130 over a direct or local area network (LAN) connection (not shown in FIG. 3) typically using secure IPsec tunnels. In alternative implementations, the connection between the RNs 115 and SN 130 may be over a wireless link or wireless local area network (W-LAN) connection (not shown in FIG. 3). The SN 130 aggregates voice and data traffic from the RNs 115 and provides connectivity over an IPsec tunnel to a security gateway SeGW 135 in an Evolved Packet Core (EPC) 140 network of a mobile operator.

Implementations of present principles will now be discussed. Many implementations of systems and methods according to present principles may be advantageously employed in virtually any cellular mobile system. Where the implementation is specific to a small cell RAN, such as that of FIG. 3, this aspect will be noted within the text.

Figure 4:
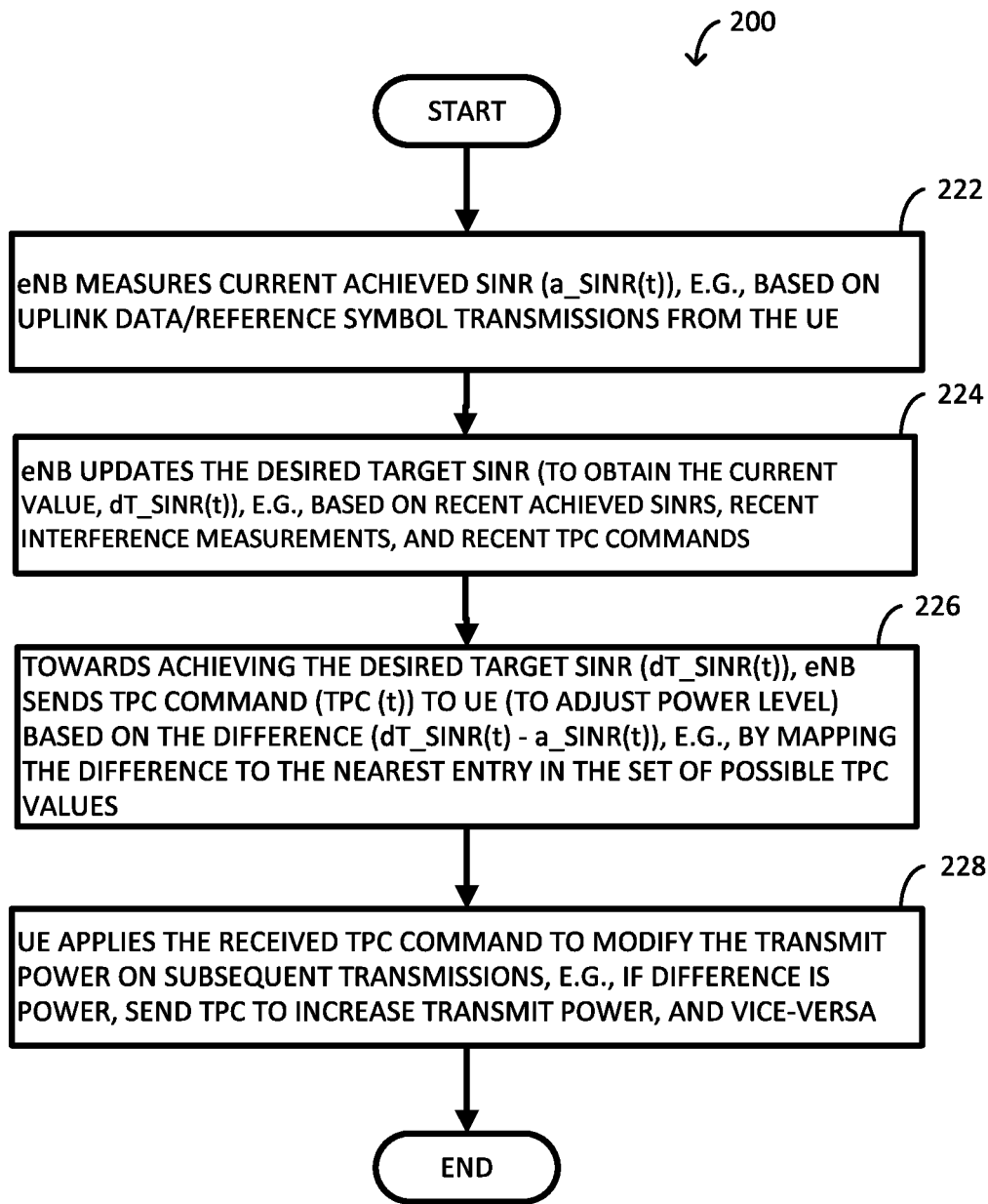
FIG. 4 is a flowchart of a method according to present principles employing power control with adaptive target SINR, in one implementation.

Referring to the flowchart 200 of FIG. 4, in one implementation of a system and method according to present principles, the unnecessary power ramp-up in CLPC may be curtailed by adaptively adjusting the desired target SINR over time. Specifically, and considering a particular eNB-UE link, as above an attempt may be made to achieve a certain desired target SINR. Steps of this process include measuring the current achieved SINR (a_SINR(t)) (step 222). Based on subsequently issued TPC commands, subsequently achieved SINR values, and/or subsequently measured interference levels, the target SINR is then altered, modified, or adapted (step 224) to better reflect the SINR that can actually be achieved, rather than persistently trying to achieve a SINR which in fact appears to be infeasible.

After a new target SINR is set (say at time instant t), and towards achieving this desired target, e.g., dT_SINR(t), the eNB then sends a current TPC command to the UE based on the difference, e.g., dT_SINR(t)-a_SINR(t), and in some implementations may map the difference to a nearest entry in a set of possible TPC values (step 226). The UE then applies the received TPC command to modify the transmit power on subsequent transmissions (step 228).

Using the method according to FIG. 4, uncontrolled UE transmit power increases may be eliminated and other benefits achieved.

In another implementation according to present principles, the mechanism used to adjust the desired target SINR may be analyzed, and a determination made as to whether the updated or adjusted target SINR is causing the CLPC to indeed progress towards achievement of the target SINR. Considered in the analysis of the adjustment includes recent issued TPC commands, recent achieved SINR values, and recent measurements of interference levels. These parameters are jointly assessed to determine the CLPC progression.

For example, if the last issued TPC command instructed the UE to increase its transmit power, but the latest measured SINR value does not show any corresponding increase compared to the last measured SINR, such may be an indication that the most recent application of CLPC was not effective. If there are also increased levels of interference power, such may indicate that another UE ramped up its own transmit power, and in this case the system may determine that the desired target SINR requires reduction to curtail further power ramp-up. One specific implementation of this adaptation, applied at time instant t, is shown by the code snippet of FIG. 5.

In this implementation, if the TPC command sent at time (t-1) instructs the UE to increase its transmit power, and if the achieved SINR at time t does not exceed the achieved SINR at time (t-1) by a certain threshold Delta1, and if the interference measured at time t exceeds the interference measured at time (t-1) by a certain threshold Delta2, then the desired target SINR at time t may be obtained by reducing the desired target SINR at time (t-1) by an amount equal to, e.g., half of the difference between the desired target SINR at time (t-1) and the achieved SINR at time t. All power level measurements, e.g., TPC command, SINR, interference, etc. are assumed to be in decibels (dB) scale, as is typical for power measurements. The proposed embodiments can be easily stated in another scale (e.g., linear scale) simply by mapping the dB scale values to another scale.

In this description, the logic contained in the code snippet of FIG. 5 is applied at any particular time instant (t), and implements one iteration of the overall CLPC operation. In the description below, applications of the code snippet of FIG. 5 are used.

In one implementation, the choice of the thresholds Delta1 and Delta2 is considered, which are the thresholds used to gauge changes to the SINR and interference power levels, respectively.

For example, an anticipated increase in the SINR may be a function of the previous TPC command, as well as a function of the previously-measured SINR and interference levels. Consequently, Delta1 can be chosen to be a time-dependent parameter, which may be a function of TPC(t-1), a_SINR(t-1), and Intf(t-1). Alternatively, Delta1 may also be picked to be a constant parameter, meant to gauge a minimal increase in the SINR that is expected from a positive TPC command, i.e., a command that instructs the UE to raise its transmit power, in order to conclude that the previous iteration of CLPC provided enough SINR gain so as to keep the target SINR unchanged. As a particular example, Delta1 may be picked to be some function of the positive TPC command with the smallest magnitude. For example, a smallest positive TPC command could be 1 dB, and such a value may be used for Delta1. Delta1 may also be a function of TPC(t-1), a_SINR(t-1), and Intf(t-1).

Regarding Delta2, the same may be used as a threshold to assess whether the interference levels have increased sufficiently to assume that another UE is also ramping up its own transmit power. In the same way as the choice for Delta1, Delta2 may be selected to be some function of the positive TPC command with the smallest magnitude. For example, a positive TPC command could be 1 dB, and this value could be employed for Delta2.

In another embodiment, instead of using multiple separate criterions as in FIG. 5 (which shows three criterions: one based on TPC, one based on achieved SINR, and one based on the interference levels), a reduced set of criterions, or even a single overall joint criterion may be formulated, to determine if it is desired to adjust the target SINR. For instance, the criteria on achieved SINR and interference levels (i.e., the second and third criterions in FIG. 5) may be combined such that the target SINR is adjusted if the following condition is met: a_SINR(t)<f(a_SINR(t-1), Intf(t), Intf(t-1), TPC(t-1)), for some function f( ).

While the increased level of interference is used in the preceding embodiments as an indication that a neighboring cell's UE also ramped up its power, an increase in the interference may also be attributed to other factors. In particular, it could be caused by the appearance of a new UE that starts off by transmitting at a high power, e.g., such a "new" UE could be served by an eNB with a much larger coverage area, requiring larger UE transmit powers. Put another way, this new UE could be served by a macrocell that is in the vicinity of a deployment of small cells. In such a scenario, the system may determine that it is better to not reduce the desired target SINR value because the interference caused by this new UE can be overcome by increased transmit powers, e.g., achieved using CLPC. This implementation would be particularly illustrated by the small cell implementation shown in FIG. 3.

In another implementation, to identify such situations when interference rises but it is undesired to reduce the target SINR, another criterion may be included and employed to decide whether to reduce the target SINR. In particular, if a maximum instantaneous jump in the measured interference levels in a past recent duration of time, e.g., the duration of time since the last iteration of CLPC, exceeds a certain threshold e.g., Delta3, a reduction in target SINR level may be contraindicated. In other words, if the interference increase is rather drastic, i.e., unlikely to have been caused by the CLPC based increase in the transmit power of another UE, a reduction of the target SINR level may be ruled out.

FIG. 6 illustrates a code snippet in which this test is implemented, and in which the modified criterion as described is depicted in the last of the "If" conditions. The code snippet of FIG. 6 uses interference level measurements at time t and (t-1) only, so that in order to assess a drastic recent jump in the interference, e.g., a jump greater than a predetermined threshold criterion, the difference in the interference levels at times t and (t-1) is simply considered. Larger time windows may also be considered with suitable modifications, e.g., the maximum of the instantaneous interference jumps, i.e., the maximum of the difference in interference between consecutive measurements may be compared with a threshold. For the choice of the threshold Delta3, as the aim is to determine if the interference increase has been caused by another UE ramping up its power based on CLPC or not, a suitable choice for Delta3 is to use a function of the positive TPC command with the largest magnitude. In the LTE standard, the largest TPC command is 3 dB, and Delta3 can be selected to be this value.

While the above described embodiments present some specific implementations of target SINR adaptation mechanisms, other implementations are also possible, and which include certain similarities to the above, e.g., are based on previous TPC commands, achieved SINR values, and interference levels. As one example, a reduction in a target SINR may be performed in another manner, such as by reducing the target SINR by another fraction, rather than one-half, of the difference (dT_SINR(t−1)−a_SINR(t)). In addition, the reduction in target SINR could also be made to be a function of a change in the achieved SINR, e.g., as a function of a_SINR(t)−a_SINR(t−1)), and/or a function of the change in the interference, e.g., as a function of Intf(t)−Intf(t−1). And as above, while the preceding embodiments only consider measurements from time instant t and (t−1), measurements from a longer window can also be considered, e.g., by taking averages or performing other sorts of filtering of the recent measurements.

The use of the time indices t and (t−1) in the preceding embodiments is only exemplary, and is meant to assist in the description of the ideas disclosed here. In practice, systems and methods according to present principles may be applied with various real world modifications. As an example, a TPC command may not actually have been issued at the specific time instant (t−1). In this case, it would be understood that, e.g., a last issued TPC command may be considered. As another example, due to transmission and processing delays, the last issued TPC command may not actually have been applied at the UE until a later or current time instant. In other words, that TPC command may still be in-flight. In this case, its impact on the achieved SINR would not be evident until the current time instant, and the target SINR adaptation would be modified appropriately, to either take into account only those TPC commands that would have already been applied, or alternately, by using knowledge of the in-flight TPC commands to predict the changes in the measured SINR and interference values that the same are expected to cause. As yet another example, the SINR adaptation procedure described above may not be applied at every possible opportunity, e.g., at every opportunity where SINR measurements and interference measurements are available and where previous TPC commands have already been applied, but only at a subset of such time instants, e.g., in a periodic or occasional manner. At a general level, systems and methods disclosed here provide for adaptation of the target SINR value, based on factors such as prior issued TPC commands, current and previous SINR measurements, and current and previous interference measurements.

In another embodiment, a lower bound may be placed on the desired target SINR value. In particular, the implementations described above propose reduction of the target SINR value, often when it is deemed that the previous iterations of CLPC did not provide significant enough SINR gains. In some cases a bound may be placed on how low the target SINR may be, so as to ensure the achievement of reliable transmission with a minimum possible modulation and coding rate parameters. Further, lower bounding the target SINR value also ensures fairness amongst competing UEs. In the 3GPP LTE standard, the lowest MCS transmission typically requires an SINR close to −5 dB. Fortunately, in even the most severe interference scenarios, this SINR may still be achievable by a UE, and hence using a lower bound close to this value would ensure some fairness amongst competing UEs.

As described, implementations described above have an advantage in that they can curtail an unnecessary ramp up in UE power. In some instances, the UE power may still be above the absolutely minimum levels required to achieve the current SINR, e.g., if the target SINR adjustment is not aggressive enough. In other instances, it is possible that some of the other UEs that were previously causing high interference have adjusted their transmission powers, so that the current SINR level may be attainable with lower UE transmit power. Towards realizing such UE transmit power minimization, in another embodiment, systems and methods according to present principles facilitate reducing the UE transmit power whenever it is feasible without impacting the performance of the link. Specifically, a mechanism may be employed such that, if the current achieved SINR is close to the current value of the desired target SINR, e.g., if the difference in the current achieved SINR and the current desired target SINR is lower than a predetermined threshold, e.g., the smallest possible magnitude of a non-zero valued TPC command, or, if the UE transmit power level exceeds a certain threshold P0, the TPC command sent by the eNB to the UE may instruct the UE to reduce its transmit power rather than maintain the current power level. For example, the threshold power P0 may be a function of P_max, the maximum possible UE transmit power. In this specific case of LTE, P_max is 23 dBm. In one implementation, P0 may be set equal to (P_max−constant), where the constant may be, e.g., 1 dB.

This mechanism may be implemented by the code snippet of FIG. 7. In FIG. 7, min(|NonZeroTPC|) is used to denote the smallest possible magnitude of a non-zero valued TPC command. The issued TPC command is −min(|NegTPC|), where min(|NegTPC|) is used to denote the negative-valued TPC command. This is exemplary, and in general, another allowed negative TPC command value may be issued. As before, all commands are assumed to be in the dB scale.

If the set of possible TPC commands contains a TPC command of value 0 dB, then an alternate way to check the first condition in the "if" statement of FIG. 7 is to check that the TPC command obtained by mapping the difference (dT_SINR(t)−a_SINR(t)) to the nearest value in the set of possible TPC commands is actually 0 dB.

Note that the embodiment described above impacts step 226 in the CLPC flowchart 200 shown in FIG. 4. In particular, while performing step 226, if the conditions specified above in FIG. 7 are met, then the eNB would issue a TPC command of −min(|NegTPC|), otherwise, as described before (and as shown in step 226 of FIG. 4), the TPC command is issued based on the value of the difference (dT_SINR(t)−a_SINR(t)), e.g., by mapping the difference to the nearest entry in the set of possible TPC values.

The preceding embodiment lead to a reduction in the UE's transmit power when the conditions in FIG. 7 are met, and if it so happens that this reduction subsequently causes a reduction in the achieved link SINR, such a reduction would be momentary. Specifically, in the next iteration of CLPC, the achieved SINR would fall below the desired target SINR, prompting the eNB to issue a positive TPC command, reinstating the SINR to the original higher value. On the other hand, if a reduction in the UE's transmit power caused by the preceding embodiment is not accompanied with a corresponding degradation of the link SINR, the purpose of this arrangement would be served, as the same SINR would have been achieved with lower UE transmit power.

In yet another embodiment, adaptation or adjustment of a desired target SINR may be instituted, but the adaptation or adjustment intended to increase, rather than decrease, the value of the desired target SINR. In more detail, the previous implementations focused on reducing the target SINR value whenever it was ascertained that the existing value appeared to be infeasible. It is reiterated that the feasibility of the target SINR depends critically on the interference from other UEs. In situations where the other UEs also ramp-up their transmit powers, trying to achieve their own target SINR, causing an increased level of interference, it may be desired to lower the desired SINR target, as discussed above. However, there may be situations where an interference causes a UE to eventually stop transmitting, or where the UE moves away. In such situations, achieving a higher SINR becomes feasible, and hence the desired SINR target value may be increased.

One possible mechanism to determine the feasibility of increasing the target SINR is to gauge the change in the interference levels. For instance, if the interference levels go down significantly, beyond a certain threshold, the target SINR may correspondingly be increased. The level of increase in the target SINR would generally depend on the interference levels and the current SINR.

In yet a further embodiment, an alternate mechanism may be employed for increasing the desired target SINR value. While increasing the target SINR based on a decrease in the measured interference as described above is in many cases possible, in some practical scenarios, it may be problematic. For instance, in case of a "bursty" interferer, which is an interferer that transmits in bursts, rather than continuously, it may not be desired to increase the target SINR based simply on an instantaneous reduction in the interference levels, as such can lead to unstable system behavior.

To overcome this challenge, one approach for facilitating a target SINR increase is as follows. Periodically or occasionally, the target SINR may be reset to a value that exceeds the current achieved SINR by a small amount (e.g., 1 dB, although a number of other values may be employed, e.g., 0.5 dB, 2 dB, just so long as the value is reasonable and not too large or small), independently of any other factors. Note that, given the description above of systems and methods according to present principles that continuously reduce the desired target SINR towards a value that is feasible, it is anticipated that at most points of time, the target SINR value would be in close proximity to the current achieved SINR. Consequently, the mechanism of this embodiment, that resets the target SINR to a value slightly exceeding the current achieved SINR, is likely to cause an increase in the target SINR value, as desired. Of course, it is possible that, in some cases, the existing target SINR would be significantly larger than the current achieved SINR, e.g., if the target SINR reduction mechanism has not operated long enough, in which case resetting the target SINR to a value slightly exceeding the current SINR is not desirable. Hence, in one implementation, the target SINR may be reset to the greater of the following two values: current achieved SINR plus a constant (e.g., 1 dB), or the existing value of the target SINR.

In this method, the preceding described reset of the target SINR may be performed at a much slower time scale as compared to the time scale at which the reduction of the target SINR described in the earlier embodiments is carried out. As one example, in 3GPP LTE systems, where subframes are transmitted every 1 ms, while the potential reduction of target SINR may be considered in every subframe where the UE is scheduled, the increase in target SINR may be applied only in every 10th such subframe. Although in this approach the target SINR was increased every so often, periodically or occasionally, due to the presence of the earlier disclosed mechanisms for target SINR reduction and UE transmit power reduction, systems and methods according to present principles implementing this approach may not cause any sustained undue increase in the target SINR and UE transmit powers. For instance, if the blindly increased target SINR is not actually feasible, it may be ascertained automatically in the next iteration of CLPC, which would then lead to a reduction of the target SINR and UE transmit power.

In another implementation, the desired target SINR value may be upper bounded, to prevent the same from rising beyond what is required. One possibility is to use an upper bound that matches the SINR required to meet the BLER criterion for the largest allowed MCS value (which in LTE would be close to 20 dB). Often, however, transmissions with the largest allowed MCS may not be required, e.g., for small payload sizes. Consequently, the upper bound on the target SINR may be picked, e.g., adaptively, based on the largest anticipated MCS that would be used, given the payload information, and so on.

Figure 8:
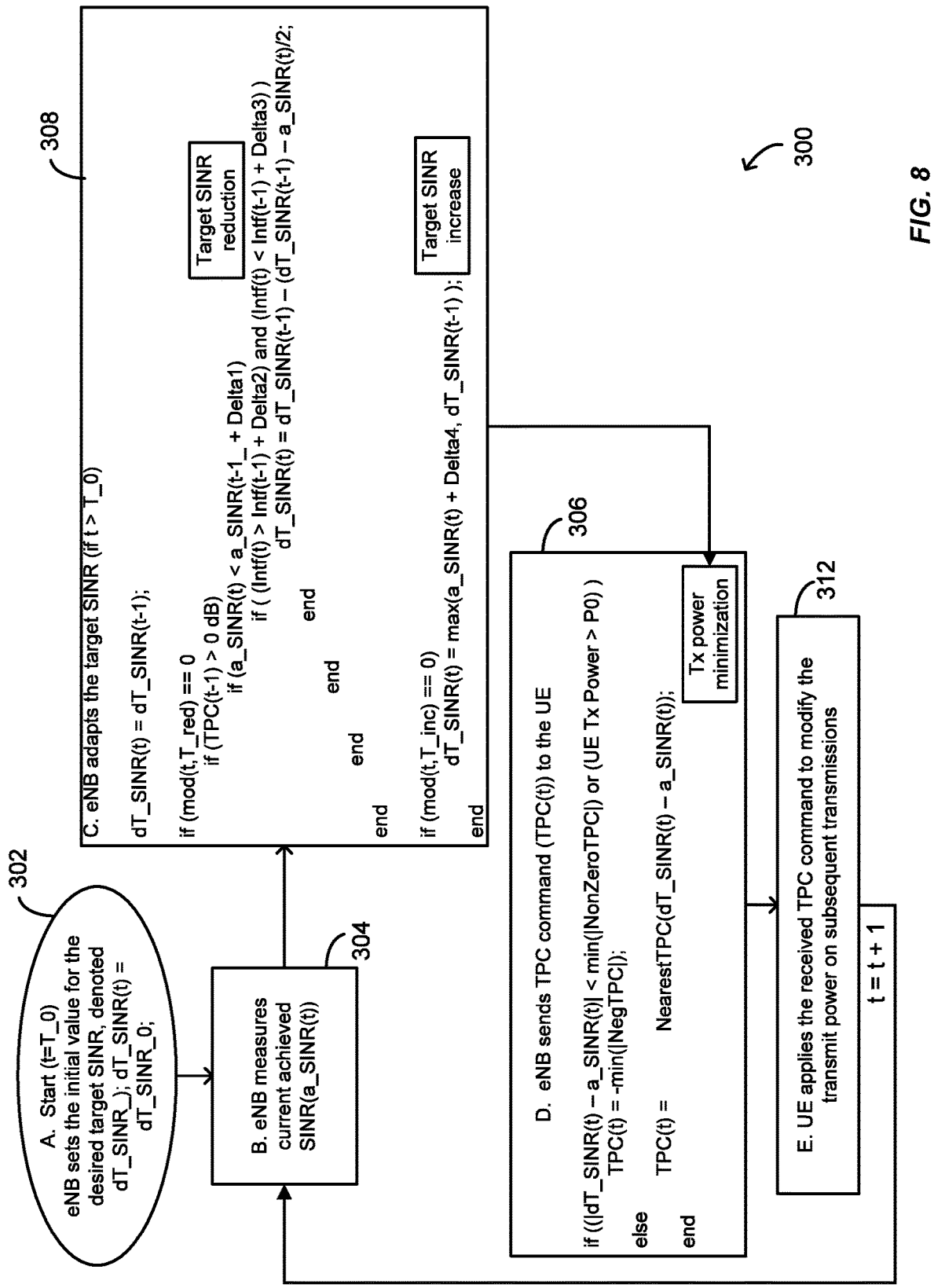
FIG. 8 is a flowchart of a method for power control with adaptive target SINR incorporating both target SINR reduction and target SINR increase, as well as UE transmit power minimization, as per present principles.

The flowchart 300 of FIG. 8 provides a combined depiction of some of the methods disclosed in the preceding embodiments. The same also depicts CLPC operation over time, rather than depicting it at only one time instant, as was considered in FIG. 4. At step 302, the initial value of the desired target SINR is denoted as dT_SINR_0, with the initial time instant being T_0. Following that, using t to denote the current time instant, as in the steps of FIG. 4, in step 304, the eNB measures the current achieved SINR, i.e., the SINR achieved at time t. In step 308, the eNB adjusts the target SINR (if t>T_0), using one or more of the various implementations described above. In the depiction in FIG. 8, the target SINR reduction mechanism is considered periodically, with the period being T_red. The target SINR increase mechanism is also considered periodically, with the period being T_inc. As discussed above, in many cases, T_inc would be significantly larger than T_red. In step 306, the eNB computes the TPC command to be sent to the UE. The UE transmit power minimization mechanism may be employed, wherein, if the current achieved SINR is close enough to the current value of the desired target SINR, or if the UE transmit power has exceeded a certain threshold, the eNB transmits a negative TPC command. Finally, in step 312, the UE applies the received TPC command to determine its subsequent transmit power. The entire process, beginning from step 304, then repeats for the next time instant.

In the uplink of a cellular system consisting of multiple base stations (or eNBs) and mobile users (or UEs), CLPC may potentially be performed in a distributed manner or a centralized manner. While a centralized approach is in some ways optimal, the same also presents significant implementation challenges, such as the existence of a central entity that communicates with all eNBs, possesses channel state information for all eNodeB-UE links in the entire system, and can perform joint user selection/FFR/scheduling across all the UEs in the system. On the other hand, in distributed CLPC, each eNodeB-UE link performs CLPC independently.

While a classical distributed CLPC algorithm can surprisingly achieve the same set of target SINRs (across the different eNodeB-UE links) as would be achieved with a centralized approach, it also has severe pitfalls. Specifically, if the set of target SINRs is not feasible to begin with, distributed CLPC can result in an uncontrolled rise in the UE transmit powers, leading to severe interference in the network and consequent system capacity degradation.

Systems and methods disclosed here generally apply the distributed approach for CLPC, and disclose methods to achieve the gains of CLPC, i.e., methods to achieve jointly feasible SINRs for different eNodeB-UE links in a distributed manner, while overcoming the potential runaway problems, e.g., high interference, encountered in classical distributed CLPC approaches. However, the distributed approach is not required in all implementations.

What has been described are systems and methods of using uplink power control, e.g., from a mobile station or UE to a base station or eNB, to facilitate adjusting the transmit power of the UE to ensure that the power level is set sufficiently high to meet the desired transmission characteristics, e.g., the desired modulation, coding rate, etc., but is not set excessively high to cause unnecessary interference with transmissions from other UEs.

Several aspects of telecommunication systems will now be presented with reference to various apparatus and methods described in the foregoing detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionalities described throughout this disclosure. One or more processors in the processing system may execute software.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on non-transitory computer-readable media. Non-transitory computer-readable media may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable non-transient media for storing or transmitting software. The computer-readable media may be resident in the processing system, external to the processing system, or distributed across multiple entities including the processing system. Computer-readable media may be embodied in a computer-program product. By way of example, a computer-program product may include one or more computer-readable media in packaging materials. Those skilled in the art will recognize how best to implement the described functionality presented throughout this disclosure depending on the particular application and the overall design constraints imposed on the overall system.

Variations of the above described systems and methods will be understood to one of ordinary skill in the art given this teaching.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A node for optimizing uplink closed loop power control in a Radio Access Network (RAN) in which one or more base stations each service a plurality of mobile stations, the node configured to:
   at each base station, for each mobile station connected to the base station, determine a transmit power level for the mobile station's uplink transmissions, wherein the node is configured to determine the transmit power level by being configured to measure a current achieved signal to interference plus noise ratio (SINR) for each mobile station, and wherein each mobile station has a desired target SINR;
   update the desired target SINR for at least one of the plurality of mobile stations based on the current achieved SINR and prior SINR measurements to obtain a current desired target SINR; and
   for the at least one mobile station, adjust the transmit power level by sending a transmission power control (TPC) command to the mobile station based on a difference between the current desired target SINR and the current achieved SINR,
   wherein the node is further configured to:
      adaptively adjust the desired target SINR over time to ultimately approach a target SINR that is feasible, and
      determine if a rise in a measured interference level over a prior duration exceeds a threshold, and if so, the node being configured to maintain the desired target SINR.

2. The node of claim 1, wherein the node is further configured to map the difference to a nearest entry in a set of possible TPC values.

3. The node of claim 1, wherein the node is further configured to determine if the desired target SINR is feasible.

4. The node of claim 1, wherein the node is further configured to determine if one or more mobile stations are progressing towards their desired target SINR.

5. The node of claim 1, wherein the node is further configured provide a lower bound on the desired target SINR, wherein the lower bound is a SINR value required to support reliable communication with a lowest possible modulation and coding rate combination.

6. The node of claim 1, wherein the node is further configured to determine if the current achieved SINR is close to the desired target SINR.

7. The node of claim 1, wherein the node is further configured to provide an upper bound on the desired target SINR, wherein the upper bound is a SINR required to support a largest modulation and coding rate combination, or wherein the upper bound is adaptive over time and based on a largest anticipated modulation and coding parameter that would be used.

8. A node for optimizing uplink closed loop power control in a Radio Access Network (RAN) in which one or more base stations each service a plurality of mobile stations, the node configured to:
  at each base station, for each mobile station connected to the base station, determine a transmit power level for the mobile station's uplink transmissions, wherein the node is configured to determine the transmit power level by being configured to measure a current achieved signal to interference plus noise ratio (SINR) for each mobile station, and wherein each mobile station has a desired target SINR;
  update the desired target SINR for at least one of the plurality of mobile stations based on the current achieved SINR and prior SINR measurements to obtain a current desired target SINR; and
  for the at least one mobile station, adjust the transmit power level by sending a transmission power control (TPC) command to the mobile station based on a difference between the current desired target SINR and the current achieved SINR,
  wherein the node is further configured to:
    adaptively adjust the desired target SINR over time to ultimately approach a target SINR that is feasible, and
    reset the desired target SINR to a higher value, and transmit a TPC command to the at least one mobile station to cause its power level to increase, if determined interference levels are determined to have been reduced beyond a threshold level.

9. The node of claim 8, wherein the node is further configured to map the difference to a nearest entry in a set of possible TPC values.

10. The node of claim 8, wherein the node is further configured to determine if one or more mobile stations are progressing towards their desired target SINR.

11. The node of claim 8, wherein the node is further configured provide a lower bound on the desired target SINR, wherein the lower bound is a SINR value required to support reliable communication with a lowest possible modulation and coding rate combination.

12. The node of claim 8, wherein the node is further configured to provide an upper bound on the desired target SINR.

13. A node for optimizing uplink closed loop power control in a Radio Access Network (RAN) in which one or more base stations each service a plurality of mobile stations, the node configured to:
  at each base station, for each mobile station connected to the base station, determine a transmit power level for the mobile station's uplink transmissions, wherein the node is configured to determine the transmit power level by being configured to measure a current achieved signal to interference plus noise ratio (SINR) for each mobile station, and wherein each mobile station has a desired target SINR;
  update the desired target SINR for at least one of the plurality of mobile stations based on the current achieved SINR and prior SINR measurements to obtain a current desired target SINR; and
  for the at least one mobile station, adjust the transmit power level by sending a transmission power control (TPC) command to the mobile station based on a difference between the current desired target SINR and the current achieved SINR,
  wherein the node is further configured to:
    adaptively adjust the desired target SINR over time to ultimately approach a target SINR that is feasible, and
    periodically reset the desired target SINR to a value exceeding the current achieved SINR by a differential amount, whereby problems associated with increasing the desired target SINR based on a decrease in measured interference are at least substantially avoided.

14. The node of claim 13, wherein the node is further configured to map the difference to a nearest entry in a set of possible TPC values.

15. The node of claim 13, wherein the node is further configured to determine if the desired target SINR is feasible.

16. The node of claim 13, wherein the node is further configured to determine if one or more mobile stations are progressing towards their desired target SINR.

17. The node of claim 13, wherein the node is further configured provide a lower bound on the desired target SINR.

18. The node of claim 13, wherein the node is further configured to provide an upper bound on the desired target SINR, wherein the upper bound is a SINR required to support a largest modulation and coding rate combination.

19. The node of claim 13, wherein the node is further configured to provide an upper bound on the desired target SINR, wherein the upper bound is adaptive over time and based on a largest anticipated modulation and coding parameter that would be used, given payload information.

* * * * *

UNITED STATES PATENT AND TRADEMARK OFFICE
CERTIFICATE OF CORRECTION

| | |
|---|---|
| PATENT NO. | : 11,039,397 B2 |
| APPLICATION NO. | : 16/880052 |
| DATED | : June 15, 2021 |
| INVENTOR(S) | : Brian Dunn et al. |

It is certified that error appears in the above-identified patent and that said Letters Patent is hereby corrected as shown below:

In the Claims

In Column 14, Line 58, Claim 5, delete "configured" and insert -- configured to --, therefor.

In Column 15, Line 43, Claim 11, delete "configured" and insert -- configured to --, therefor.

In Column 16, Line 39, Claim 17, delete "configured" and insert -- configured to --, therefor.

Signed and Sealed this
Twenty-sixth Day of July, 2022

Katherine Kelly Vidal
*Director of the United States Patent and Trademark Office*